United States Patent
Gasborro et al.

(10) Patent No.: US 7,986,961 B2
(45) Date of Patent: Jul. 26, 2011

(54) MOBILE COMPUTER COMMUNICATION INTERFACE

(75) Inventors: Henry Frank Gasborro, Marina del Rey, CA (US); Jay Frederking, Irvine, CA (US); Brian Bieber, Redondo Beach, CA (US); Joseph Edwin Carpenter, Long Beach, CA (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 874 days.

(21) Appl. No.: 11/312,122

(22) Filed: Dec. 20, 2005

(65) Prior Publication Data

US 2007/0142091 A1 Jun. 21, 2007

(51) Int. Cl.
H04M 11/04 (2006.01)
H04M 3/42 (2006.01)
H04M 3/493 (2006.01)
H04M 1/00 (2006.01)
H04W 24/00 (2009.01)
G01C 21/00 (2006.01)
G01C 21/30 (2006.01)
G01C 21/32 (2006.01)

(52) U.S. Cl. .......... 455/550.1; 455/404.2; 455/457; 455/414.2; 701/200; 701/211; 701/213

(58) Field of Classification Search ........... 455/404.2, 455/414.1, 414.2, 457, 550.1, 566; 701/200, 701/211, 213
See application file for complete search history.

(56) References Cited

U.S. PATENT DOCUMENTS

| | | | | |
|---|---|---|---|---|
| 5,848,373 | A * | 12/1998 | DeLorme et al. | 701/200 |
| 6,202,026 | B1 * | 3/2001 | Nimura et al. | 701/211 |
| 6,526,352 | B1 * | 2/2003 | Breed et al. | 701/213 |
| 6,735,557 | B1 * | 5/2004 | Castellar et al. | 703/5 |
| 7,236,882 | B2 * | 6/2007 | Karaoguz et al. | 701/211 |
| 2002/0008693 | A1 * | 1/2002 | Banerjee et al. | 345/182 |
| 2002/0010544 | A1 * | 1/2002 | Rudow et al. | 701/213 |
| 2003/0231842 | A1 * | 12/2003 | Kropp | 385/92 |
| 2004/0005914 | A1 * | 1/2004 | Dear | 455/563 |
| 2004/0121756 | A1 * | 6/2004 | Griffin et al. | 455/404.2 |
| 2006/0128354 | A1 * | 6/2006 | Carle et al. | 455/404.1 |
| 2007/0106457 | A1 * | 5/2007 | Rosenberg | 701/200 |

* cited by examiner

Primary Examiner — Andrew Wendell
(74) Attorney, Agent, or Firm — Tarolli, Sundheim, Covell & Tummino LLP

(57) ABSTRACT

A system and method is provided for a mobile computer communication interface. One embodiment includes a mobile computer communication interface. The mobile computer communication interface comprises a transceiver operative to send and receive wireless communications to and from a host computer. The mobile computer communication interface may also comprise a touch-screen display, the touch-screen display being operative to receive inputs from a user and remotely display outputs provided by the host computer. The mobile computer communication interface may also comprise a controller operative to wirelessly access and remotely control the host computer in response to inputs from the touch-screen display.

38 Claims, 6 Drawing Sheets

MOBILE COMPUTER COMMUNICATION INTERFACE

TECHNICAL FIELD

The present invention relates generally to communications and computer systems, and specifically to a mobile computer communication interface.

BACKGROUND

The use of communication systems having wireless mobile communication units has become widespread. Wireless communication systems that operate within a cell or coverage area provide several important advantages over conventional wired systems. For example, wireless communication users can communicate in locations where wired service is not available or feasible, such as remote or rugged locations. Additionally, wireless communication users within the cell have much more mobility because the units do not have to be connected to a fixed wired network. These and other favorable characteristics make wireless communications ideally suited for personal, business, military, search and rescue, law enforcement, water vehicle, and other field related applications.

In some applications, it is desirable to maintain consistent periodic communication with one or more other communications units. Such consistent communications are useful in situations that have a risk of incapacitation of the user, such as battlefield applications, recreational activities in rugged environments, or civilian search and rescue operations. If the periodic communications from the user cease, a search can be carried out at the last reported location. A variation on this theme could include an automated communications unit that periodically broadcasts a signal to other communication units, such that the signal itself can be employed to locate the user.

If an area is equipped with robust communications infrastructures (e.g., cell towers), there are relatively easy ways to establish and maintain such wireless communications to mobile users, by making use of the infrastructure. However, there are some endeavors, such as search and rescue and/or military applications, where it is necessary to provide such a wireless communications capability even in an area that does not have such a communications infrastructure, and in such cases it is much more difficult to establish and maintain such wireless communications to mobile users.

Current communications implementations in areas without a communications infrastructure are often limited by weight, size, and/or battery life restrictions. In addition to, many such search and rescue and/or military applications could benefit greatly from forms of wireless communications such as location data, situational awareness data, and other forms of useful data acquisition. However, a soldier or a firefighter may not be able to spare much time or even both hands in the midst of performing his/her duties to communicate or transmit and receive data to and from other users of his/her unit. Accordingly, such other forms of wireless communications are limited not only by the same limitations as voice communications, but may be further limited by difficulties in utilization based on situational magnanimity.

SUMMARY

One embodiment includes a mobile computer communication interface. The mobile computer communication interface comprises a transceiver operative to send and receive wireless communications to and from a host computer. The mobile computer communication interface may also comprise a touch-screen display, the touch-screen display being operative to receive inputs from a user and remotely display outputs provided by the host computer. The mobile computer communication interface may also comprise a controller operative to wirelessly access and remotely control the host computer in response to inputs from the touch-screen display.

Another embodiment of the present invention includes a wrist-mounted mobile computer communication interface. The wrist-mounted mobile computer communication interface comprises a global positioning satellite (GPS) receiver operative to receive location information corresponding to a physical location of the wrist-mounted mobile computer communication interface, and a transmitter operative to wirelessly transmit situational awareness (SA) data to a host computer. The SA data could include the location information. The wrist-mounted mobile computer communication interface also comprises a receiver operative to wirelessly receive video data from the host computer. The video data could be a map image of a geographical area comprising the physical location of the wrist-mounted mobile computer communication interface. The wrist-mounted mobile computer communication interface also comprises a video decoder operative to decode the video data. The wrist-mounted mobile computer communication interface further comprises a touch-screen display operative to receive inputs from the user and to display the SA data superimposed on the map image.

Another embodiment of the present invention includes a mobile communication system. The mobile communication system comprises a plurality of wrist-mounted mobile computer communication interfaces. Each of the plurality of wrist-mounted mobile computer communication interfaces may comprise an organic LED touch-screen display and a GPS receiver. The GPS receiver can be operative to receive location information corresponding to a physical location of a respective one of the plurality of wrist-mounted mobile computer communication interfaces. The mobile communication system can also comprise a host computer, the host computer can be operative to wirelessly transmit and receive control, display, and information data to and from each of the plurality of wrist-mounted mobile computer communication interfaces. Each of the plurality of wrist-mounted mobile computer communication interfaces can be operative to transmit situational awareness (SA) data to the host computer. The SA data could include the location information. Each of the plurality of wrist-mounted mobile computer communication interfaces can be further operative to receive a map image from the host computer. The map image could be a geographical area comprising the physical location of each of the respective wrist-mounted mobile computer communication interfaces, and could include the SA data associated with each of the plurality wrist-mounted mobile computer communication interfaces.

Another embodiment of the present invention includes a method. The method comprises receiving location information of each of a plurality of wrist-mounted mobile computer communication interfaces. Each of the plurality of wrist-mounted mobile computer communication interfaces can be worn by a respective one of the plurality of users, and the location information can correspond to a physical location of the respective one of the plurality of wrist-mounted mobile computer communication interfaces that is receiving the location information. The method also comprises transmitting SA data from each of the plurality of wrist-mounted mobile computer communication interfaces to a host computer. The SA data can include the location information of each of the plurality of wrist-mounted mobile computer communication interfaces. The method can also comprise transmitting a map image that includes the SA data associated with each of the plurality of wrist-mounted mobile computer communication interfaces to at least one of the wrist-mounted mobile computer communication interfaces. The method further comprises displaying the map image on a touch-screen display of at least one of the plurality of wrist-mounted mobile computer communication interfaces.

DETAILED DESCRIPTION

The present invention relates generally to communications and computer systems, and specifically to a mobile computer communication interface. A mobile computer communication interface is provided that includes a transceiver. The transceiver can send and receive wireless communications to and from at least one host computer. The wireless communications can include video, voice, and information data. The mobile computer communication interface may also include a touch-screen display that can receive inputs from a user by touch, from the user's finger and/or a stylus. One or more host computers could wirelessly couple a plurality of the mobile computer communication interfaces to form a communications system. As such, at least some of the mobile computer communication interfaces in the communication system could also include a communications interface that can wirelessly access and remotely control the one or more host computers. The touch inputs on the touch-screen display of a given mobile computer communication interface could therefore simulate at least one of keyboard and mouse inputs on the one or more host computers. In addition, the one or more host computers could wirelessly provide still images and/or video data including a basemap with continuously updated overlays showing real time position and situational awareness (SA) information to each of the mobile computer communication interfaces in the communication system, such that each user of the communication system could receive SA data of one or more of the other users.

Figure 1:
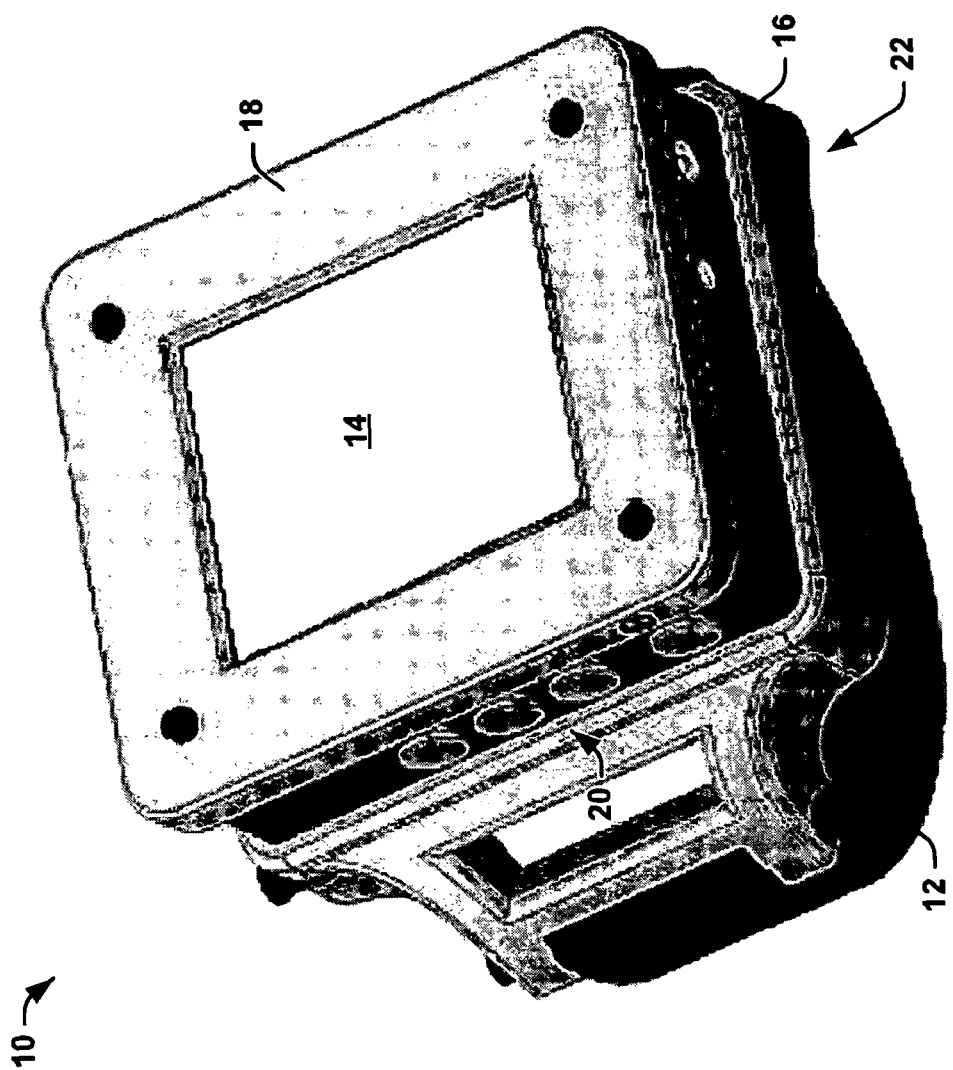
FIG. 1 illustrates an example of a mobile computer communication interface in accordance with an aspect of the invention.

FIG. 1 illustrates a mobile computer communication interface 10 in accordance with an aspect of the invention. The mobile computer communication interface 10 includes a wrist-strap 12 that could allow the mobile computer communication interface 10 to be worn by a user, such as a soldier or an emergency rescue person. It is to be understood, however, that other means besides the wrist-strap 12 could be provided for the mobile computer communication interface 10 to mount it to the given user, such as, for example, a clip, a locking mechanism, a neck-strap, or multiple straps. The wrist-strap 12 makes it possible for the user to quickly and easily access the mobile computer communication interface 10 while possibly leaving one hand free to perform his/her duties in the field.

The mobile computer communication interface 10 also includes a touch-screen display 14. The touch-screen display 14 could be an organic light-emitting diode (LED) display screen that allows the user to view the touch-screen display 14 from wide angles. In addition, an organic LED display screen allows higher resolution, full motion video display at a greatly reduced operating voltage and power consumption. As an example, the touch-screen display 14 could allow the user to view a real-time video map image of a surrounding area at a high resolution. The touch-screen display 14 may also include a 4-wire resistive touch screen. Accordingly, the touch-screen display 14 may also be capable of receiving touch inputs, either from the user's finger or from a stylus (not shown) that could be attached to or mounted within the mobile computer communication interface 10.

The mobile computer communication interface 10 also includes a metallic exterior cover 16 having a top surface 18. The metallic exterior cover 16 could house the internal components of the mobile computer communication interface 10, and further could be conductively coupled to the electronic circuit components housed therein. For example, the metallic exterior cover 16 could be conductively coupled to a negative voltage supply rail for the internal electronic circuit components to behave as a ground. As such, the metallic exterior cover 16 could not only provide a rugged protection for the more vulnerable electronic circuit components stored therein, but could also provide capability as a heat-sink and/or provide protection against electromagnetic interference (EMI). It is to be understood that the capability of the metallic exterior cover 16 could be extended to substantially all or merely a portion of the exterior of the mobile computer communication interface 10. For example, the metallic exterior cover 16 could include only the top surface 18, or could alternatively include the entirety of the mobile computer communication interface 10, including the wrist-strap 12.

In addition to the inputs available to the mobile computer communication interface 10 via the touch-screen display 14, the mobile computer communication interface 10 may also include a plurality of external input/output devices 20, such as, for example, pushbuttons and LED indicators. The plurality of external input/output devices 20 are demonstrated in the example of FIG. 1 as being on the side of the metallic exterior cover 16. However, it is to be understood that the plurality of external input/output devices 20 could reside anywhere that can be practicably accessed or viewed by the user, such as, for example, on the top surface 18 of the metallic exterior cover 16. These external input/output devices 20 allow additional user interface to the mobile computer communication interface 10, such that more important and/or frequently accessed functionality can be moved off the touch-screen display 14 to conserve valuable screen space. In addition, the mobile computer communication interface 10 may also include other peripheral ports 22 on its exterior, such as, for example, an input port for an external power supply, such that an internal battery power supply can be recharged, or an interface port for a communications connection, such as a universal serial bus (USB) port.

In addition to the above described external features of the mobile computer communication interface 10, the mobile computer communication interface 10 can also be capable of wireless communication with one or more host computers, and also to other mobile computer communication interfaces, as will be described further below with regard to FIG. 3. In addition, the mobile computer communication interface 10 may also include a microcontroller/microprocessor and memory to allow the mobile computer communication interface 10 to act as a standalone computer, such that the user can interface an operating system via the touch-screen display 14 and perform any sort of computing necessary for the user. For example, the mobile computer communication interface 10 can include a database that allows user input and/or modification, such as objectives to be completed by a soldier or rescue worker, among other things. Because the mobile computer communication interface 10 can be worn on the wrist via the wrist-strap 12 or other such device, the mobile computer communication interface 10 can be easily and quickly accessed, even when the rigorous demands on the user would normally not permit it.

Figure 2:
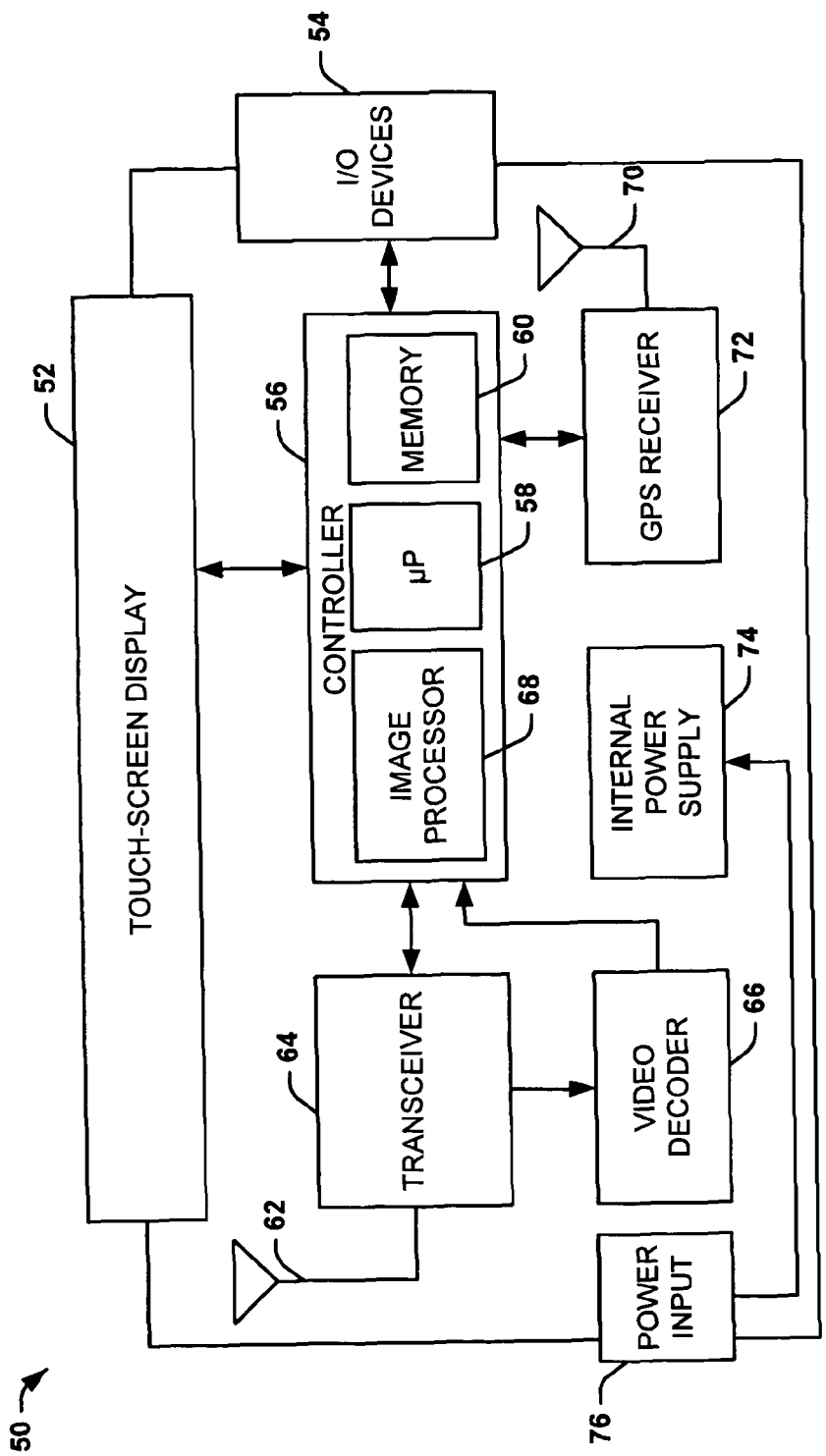
FIG. 2 illustrates an example of a block diagram of a mobile computer communication interface system in accordance with an aspect of the invention.

FIG. 2 illustrates a mobile computer communication interface system 50 in accordance with an aspect of the invention. The mobile computer communication interface system 50 includes a touch-screen display 52. The touch-screen display 52 could be an organic LED able to display video data, and could also be operative to receive touch inputs from a user, such as from a finger or a stylus. The mobile computer communication interface system 50 also includes input/output (I/O) devices 54, such as pushbuttons and LED indicators. The I/O devices 54 could be more important and/or frequently accessed functionality that can be moved off the touch-screen display 52 to conserve valuable screen space. As an example, the I/O devices 54 could include a power button, a volume button, and/or a battery life indicator. The mobile computer communication interface system 50 could also include a mode select button, such that the user could page through various screens, each having a group of related functions, on the touch-screen display 52.

Both the touch-screen display 52 and the I/O devices 54 are coupled to a controller 56. The controller 56 includes a microcontroller/microprocessor 58 (labeled as µP) and a memory 60. The user can input data into the mobile computer communication interface system 50 via the touch screen display 52 and/or the I/O devices 54. The data can be processed by the microcontroller/microprocessor 58 and/or stored in the memory 60. In addition, data can be retrieved from the memory 60 and displayed on the touch-screen display 52.

The mobile computer communication interface system 50 can act as a wireless communications device. The mobile computer communication interface system 50 includes an antenna 62 coupled to a transceiver 64. The antenna 62 is capable of transmitting and receiving high-frequency wireless signals that are modulated and demodulated by the transceiver 64, such that the mobile computer communication interface system 50 can transmit and receive voice, video, and/or information data to and from other mobile computer communication interfaces, a wireless router, and/or a host computer. As an example, the mobile computer communication interface system 50 can wirelessly transmit and receive data using IEEE 802.11 (i.e., WiFi), IEEE 802.15 (i.e., Bluetooth), or MeshNetwork communication standards. In the example of the use of a Bluetooth communications standard, the mobile computer communication interface system 50 may be capable of being bonded with another Bluetooth device. The transceiver 64 is coupled to the controller 56, such that transmitted and received data can be processed by the microcontroller/microprocessor 58 and/or stored in the memory 60. In addition, as will be described further below regarding FIG. 3, the transceiver 64 can also be used in conjunction with the controller 56 to wirelessly access and remotely control a host computer.

The transceiver 64 is also coupled to a video decoder 66. The video decoder 66 is capable of decoding, for example, National Television System Committee (NTSC) encoded video images in either a composite or S-video format. The video decoder 66 is coupled to the controller 56, which also includes an image processor 68. The image processor 68 is operative to process the video data and display the video data on the touch-screen display 52. As an example, the video data may include a basemap image and continuously updated overlays showing the user of the mobile computer communication interface system 50, other users in a communication system that includes the mobile computer communication system 50, and other pertinent geographic data. It is to be understood that the mobile computer communication interface system 50 is not limited to just receiving video data, but that video data could be generated, for example, from a plug-in peripheral device and transmitted from the mobile computer communication interface system 50 to other mobile computer communication interfaces, a wireless router, and/or a host computer.

The mobile computer communication interface system 50 also includes a global positioning satellite (GPS) antenna 70 and a GPS receiver 72. The GPS antenna 70 is operative to receive a GPS location signal from a GPS satellite system, the GPS location signal being operative to communicate location information to the user of the mobile computer communication interface system 50. The GPS receiver 72 interprets the location information and transfers the interpreted location information to the controller 56. A user of the mobile computer communication interface system 50 can transmit situational awareness (SA) data that includes the location data to other mobile computer communication interfaces, a wireless router, and/or a host computer. Additionally, as will be demonstrated further in the example of FIG. 4 in accordance with an aspect of the invention, a communications system that includes the mobile computer communication interface system 50 can utilize the location data in conjunction with video data to transmit location data of the users of the communication system.

The mobile computer communication interface system 50 further includes an internal power supply 74. The internal power supply 74 could be, for example, a rechargeable battery, such as a lithium ion battery. The internal power supply 74 is coupled to a power input 76, such that an external power supply (e.g., a DC power adaptor) could be plugged into the power input 76. The external power supply could thus supply power to the mobile computer communication interface system 50 while it is plugged into the power input 76, allowing the mobile computer communication interface system 50 to operate from the external power supply while the internal power supply 74 recharges.

It is to be understood that the mobile computer communication interface system 50 is not intended to be limited by the example of FIG. 2. Many components necessary for operation of the mobile computer communication interface system 50, as well as much functionality associated with the illustrated components, have been omitted for the sake of simplicity of explanation. Additionally, in accordance with an aspect of the invention, the mobile computer communication interface system 50 could also include additional components as may be deemed necessary for certain applications. For example, the mobile computer communication interface system 50 may include sensors, such as an electronic compass and/or a barometric altimeter, and may further include additional interface devices, such as connection ports to peripheral devices.

Figure 3:
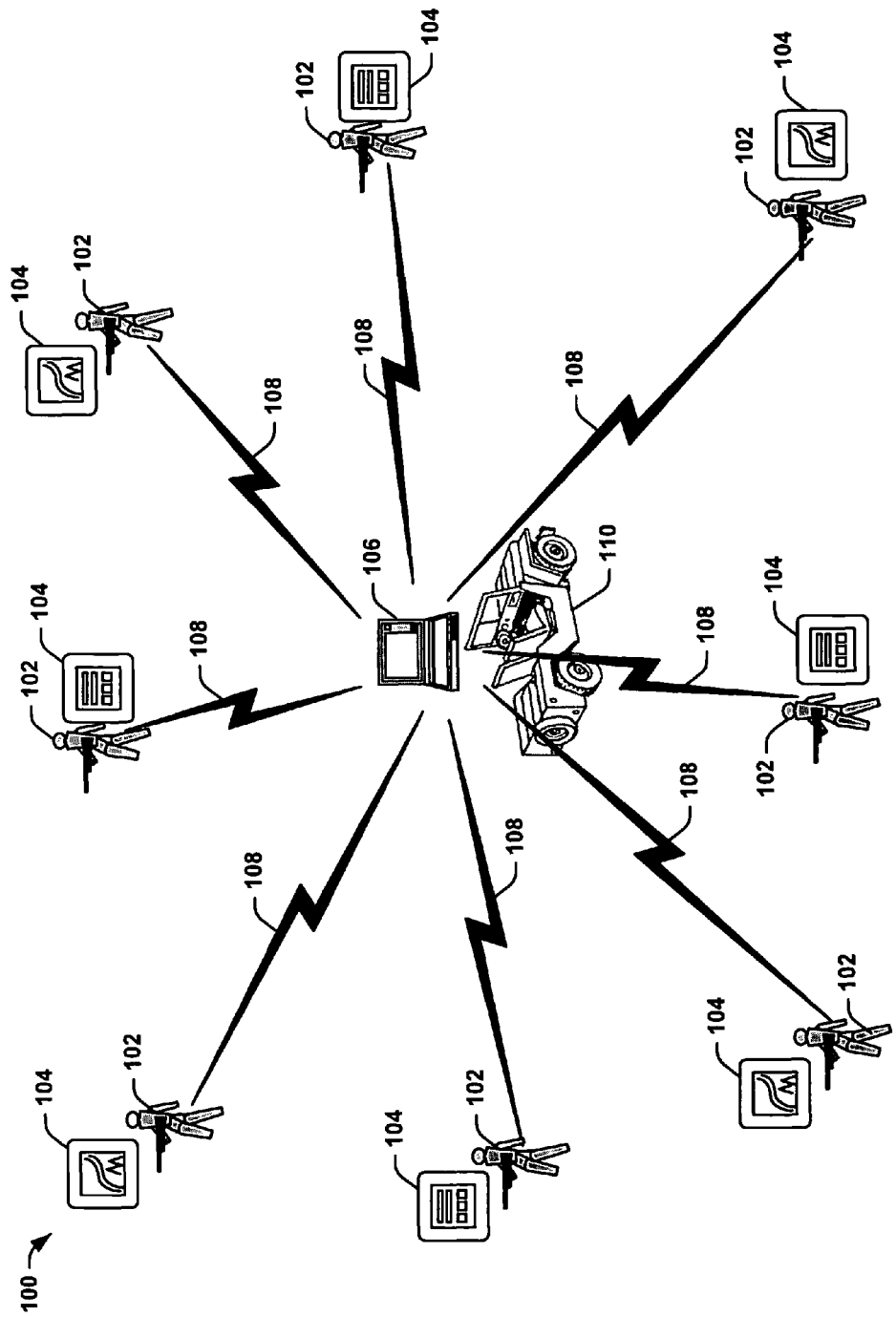
FIG. 3 illustrates an example of a communication system in accordance with an aspect of the invention.

FIG. 3 illustrates a communication system 100 in accordance with an aspect of the invention. The communication system 100 includes a plurality of users 102, each wearing a mobile computer communication interface 104 (demonstrated as enlarged in the example of FIG. 3). The users 102 are demonstrated in the example of FIG. 3 as armed soldiers, but they could also be any other type of user that may require easy access to mobile computer communication interfaces 104, such as, for example, emergency rescue workers. It is to be understood that the mobile computer communication interfaces 104 may not be worn on the wrists of the respective users 102, but could be worn in any other fashion, such as, for example, mounted to a weapon or other tool carried by the user, worn on a belt or neck-strap, or attached in any way to the respective user's person such that is easily accessible by the user 102. The mobile computer communication interfaces 104 could each be employed by the users 102 to access a location of everyone in a unit task organization within a map of the area. Additionally, the users 102 can also use the mobile computer communication interfaces 104 for map-viewing applications, wireless communications applications, or any of a variety of other applications in accordance with an aspect of the invention.

The mobile computer communication interfaces 104 of the users 102 are each communicatively coupled to a host computer 106 via a communications link 108. The host computer 106 could be merely a communications router, or it could be a separate computing system capable of transmitting and receiving data to and from the mobile computer communication interfaces 104. The communications links 108 could be wireless communications in any of the WiFi, Bluetooth, and MeshNetwork communication standards. The host computer could be mounted in an operations vehicle 110. The operations vehicle 110 is demonstrated in the example of FIG. 3 as a military land vehicle, but the operations vehicle could be any other type of vehicle capable of moving with the communications system 100, such as an ambulance or an aircraft.

As an example, the host computer 106 could receive voice, video, and/or information data from a given one of the mobile computer communication interfaces 104 via a respective one of the communications links 108, and could retransmit the same voice, video, and/or information data to one or more of the remaining mobile computer communication interfaces 104. Additionally, the host computer 106 could periodically and/or continuously transmit and receive voice, video, and/or information data to and from one or more of each of the mobile computer communication interfaces 104. It is to be understood that wireless communications between the mobile computer communication interfaces 104 may not be limited to being routed through the host computer 106 via the communications links 108, but that the mobile computer communication interfaces 104 could also wireless transmit and receive voice, video, and/or information data between each other.

The mobile computer communication interfaces 104 can also wirelessly access and remotely control the host computer 106. As an example, a given user 102 of a respective one of the mobile computer communication interfaces 104 can wirelessly access the host computer 106 via the respective mobile computer communication interface 104, such that the user 102 can wirelessly access the processor, memory, and/or network capabilities of the host computer 106. In turn, the host computer 106 can wirelessly transmit display data to the respective mobile computer communication interface 104, such that a touch-screen display of the respective mobile computer communication interface 104 can emulate a display of the host computer 106. The user 102 can enter inputs into the touch-screen display of the mobile computer communication interface 104 using a finger or a stylus, such that the inputs can simulate mouse and/or keyboard inputs to the host computer 106. The wireless inputs to the host computer 106 from the mobile computer communication interface 104 can be used, for example, to launch applications on the host computer 106, to input data to the host computer 106, and to download and view information and/or data from the host computer 106 on the mobile computer communication interface 104. The host computer 106 could include a traffic controller (not shown), such that the host computer 106 can prevent certain ones of the mobile computer communication interfaces 104 from logging into the host computer 106, can queue requesting mobile computer communication interfaces 104 to allow only a single mobile computer communication interface 104 to log into the host computer 106 at a time, or can allow multiple mobile computer communication interfaces 104 to log into the host computer 106 simultaneously.

As an example, a given one of the users 102 of the mobile computer communication interfaces 104 may need to obtain information during an operation. The needed information could be information that is accessible via the Internet. The user 102 could wirelessly request permission to obtain control of the host computer 106 in an attempt to access the needed information. The host computer 106, using the traffic controller, could accept the request to control the host computer 106. The user 102 could then log into the host computer 106. The host computer 106 can then transmit display data corresponding to an active display of the host computer 106 to the mobile computer communication interface 104. The user 102 thus receives an active screen image on the touch-screen display that is substantially identical to that which appears on the host computer 106, such that the user 102 simulates keyboard and mouse inputs on the host computer 106 using his/her finger or a stylus on the mobile computer communication interface 104. The user 102 could then enter inputs to the touch-screen display of the respective mobile computer communication interface 104 to access the Internet from the host computer 106 via the communications link 108. The inputs to the touch-screen display of the respective mobile computer communication interface 104 are transmitted as control data to the host computer 106, to which the host computer 106 responds by transmitting information data back to the respective mobile computer communication interface 104, the information data corresponding to the requested information. Upon obtaining the information data including the needed information, the user 102 could log-out of the host computer 106 and return to the operation.

It is to be understood that the communication system 100 is not intended to be limited by the example of FIG. 3. As an example, the communication system 100 could include more than one host computer 106, such that communication ranges can be substantially increased by geographically staggering the two or more host computers 106. Each such additional host computer 106 could also be included in its own operations vehicle 110, which could be different types of vehicles, such as ground vehicles and aircraft. Alternatively, the communications system 100 may not have a host computer 106, such that each of the mobile computer communication interfaces 104 communicate directly with one another.

Figure 4:
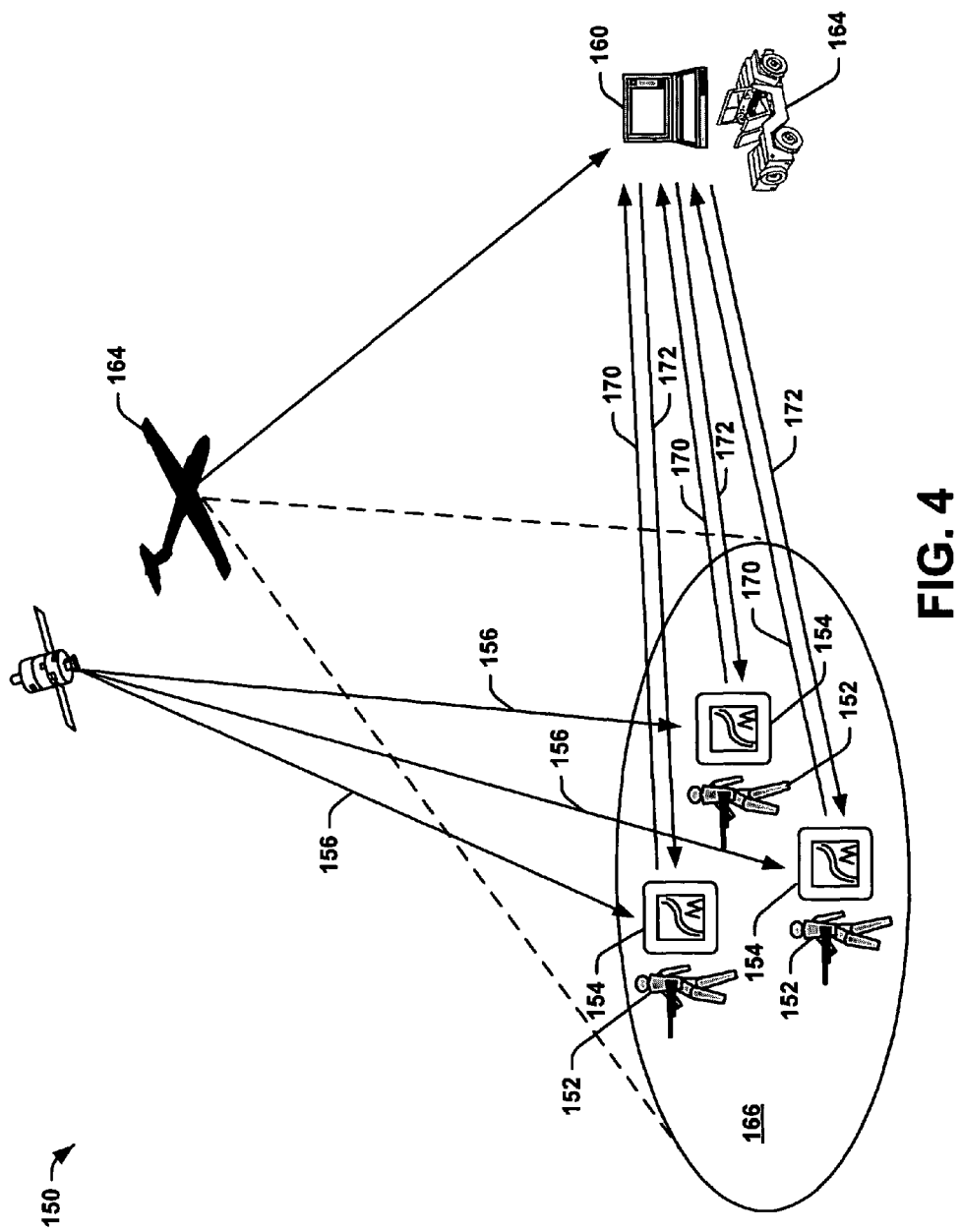
FIG. 4 illustrates another example of a communication system in accordance with an aspect of the invention.

FIG. 4 illustrates a communication system 150 in accordance with an aspect of the invention. The communication system 150 includes a plurality of users 152, each wearing a mobile computer communication interface 154 (demonstrated as enlarged in the example of FIG. 4). The users 152 are demonstrated in the example of FIG. 4 as armed soldiers, but the users 152 could be any other type of user that may require easy access to the mobile computer communication interface 154, such as, for example, emergency rescue workers. Furthermore, it is to be understood that despite FIG. 4 demonstrating only three users 152, any number of users 152, each wearing a mobile computer communication interface 154, could be included in the communication system 150 in accordance with an aspect of the invention. It is also to be understood that the mobile computer communication interfaces 154 may not be worn on the wrists of the users 152, but could be worn in any other fashion, such as, for example, mounted to a weapon or other tool carried by the users 152, worn on a belt, or attached in any way to the users' persons such that they are easily accessible by the users 152.

Each of the mobile computer communication interfaces 154 could include a global positioning satellite (GPS) antenna and receiver, such as demonstrated in the example of FIG. 2 above. As such, the mobile computer communication interfaces 154 could receive a GPS signal 156 from a GPS satellite system 158. The GPS signal 156 could signify location information regarding the present location of each of the users 152. The location information regarding the users 152 could be used to generate situational awareness (SA) data. The SA data could include the location data pertaining to the respective user 152, and could also include other information regarding the respective user 152, such as whether the respective user 152 is still alive, wounded, out of ammunition, or any other data pertaining to the status of the user 152. Additionally, the SA data could simply be used to generate a distress signal.

The communication system 150 also includes a host computer 160 mounted in an operations vehicle 162. It is to be understood that the communications system 150 could include many such host computers 160, each mounted in a respective one of many operations vehicles 162, despite the example of FIG. 4 illustrating only a single one of each. The host computer 160 is operative to maintain wireless communications with the users 152 via the mobile computer communication interfaces 154, as described above in the example of FIG. 3. The wireless communications could be in WiFi, Bluetooth, or MeshNetwork communication standards. The users 152 could also wirelessly access and remotely control the host computer 160, such that touch inputs using a finger or stylus on the mobile computer communication interface 154 could simulate keyboard and/or mouse inputs on the host computer 160.

The host computer 160 could also maintain wireless communications with an observation vehicle 164. The observation vehicle 164 could be an aircraft circling above a geographic region of interest and generating data regarding the geographic region of interest. In the example of FIG. 4, the observation vehicle 164 includes a camera that records real-time video image or map data of a battlefield region 166. In the example of FIG. 4, the battlefield region 166 is a geographical area that can include the physical location of each of the users 152. As an example, the observation vehicle 164 could be a high-altitude spy plane that records the real-time video image or map data of the battlefield region 166 as it circles above the battlefield region 166. As an alternative example, the observation vehicle 164 could be a satellite that records the real-time video image or map data of the battlefield region 166 from an earth orbit. The observation vehicle 164 transmits the real-time video image or map data of the battlefield region 166 to the host computer 160 via a communications link 168. It is to be understood that the operations vehicle 162 and the host computer 160 may not be outside the area of the battlefield region 166, as depicted in the example of FIG. 4, but could instead be within the battlefield region 166 along with the users 152. In addition, the observation vehicle 164 may not record a real-time video image of the battlefield region 166, but could instead take still photographs of the battlefield region 166, such that the observation vehicle 164 transmits the still photographs to the host computer 160 via the communications link 168. Furthermore, the mobile computer communication interfaces 154 could be used to view map data of an area other than of the battlefield region 166, such that a given user 152 could, for example, view a map of an area miles away for logistical purposes.

Upon generating the SA data including the location data, each of the mobile computer communication interfaces 154 transmits the SA data pertaining to the respective users 152 to the host computer 160 via communications links 170. The transmission of the SA data from the mobile computer communication interfaces 154 to the host computer 160 could involve an affirmative step from the respective user 152, or it could be an automatic transmission that periodically or constantly occurs. The host computer 160 receives both the SA data pertaining to each of the users 152 from the mobile computer communication interfaces 154 via the communications links 170 and the real-time video image or map data of the battlefield region 166 transmitted from the observation vehicle 164 via the communications link 168. The host computer 160 could combine the SA data pertaining to each of the users 152 with the real-time video image or map data of the battlefield region 166, such that it could superimpose the SA data pertaining to each of the users 152 onto the real-time video image or map data of the battlefield region 166. The host computer 160 then transmits the real-time video image or map data of the battlefield region 166 with the superimposed SA data pertaining to each of the users 152 to each of the users 152 via communications links 172. Accordingly, each of the users 152 receives a real-time video map of the battlefield region 166 on the touch-screen displays of each of the mobile computer communication interfaces 154. The real-time video map of the battlefield region 166 could include the SA data of each of the users 152, such that each of the users 152 can view the SA data of each of the users 152, including relative locations of each of the users 152 in the battlefield region 166 and other SA data, such as whether a given user is wounded, out of ammunition, or in distress. Additionally, each of the users 152 could also view relative locations of enemy troops, as will be demonstrated further below regarding FIG. 5.

It is to be understood that, despite the example of FIG. 4 demonstrating a military application, the example of FIG. 4 could also apply to a variety of other applications that may require quick and easily accessible computing and geographical area viewing. For example, the users 152 could be emergency rescue workers, and the "battlefield region" 166 could be an array of city blocks, such that each of the users 152 can view relative locations of each other and view potential obstacles that may slow them down, such as heavy traffic conditions and/or blocked streets. Additionally, the example of FIG. 4 is not intended to be limiting. As an example, the communication system 150 could include more than one host computer 160 located in a variety of different operations vehicles 162, as well as more than one observation vehicle 164, with each being a different kind of observation vehicle 164.

Figure 5:
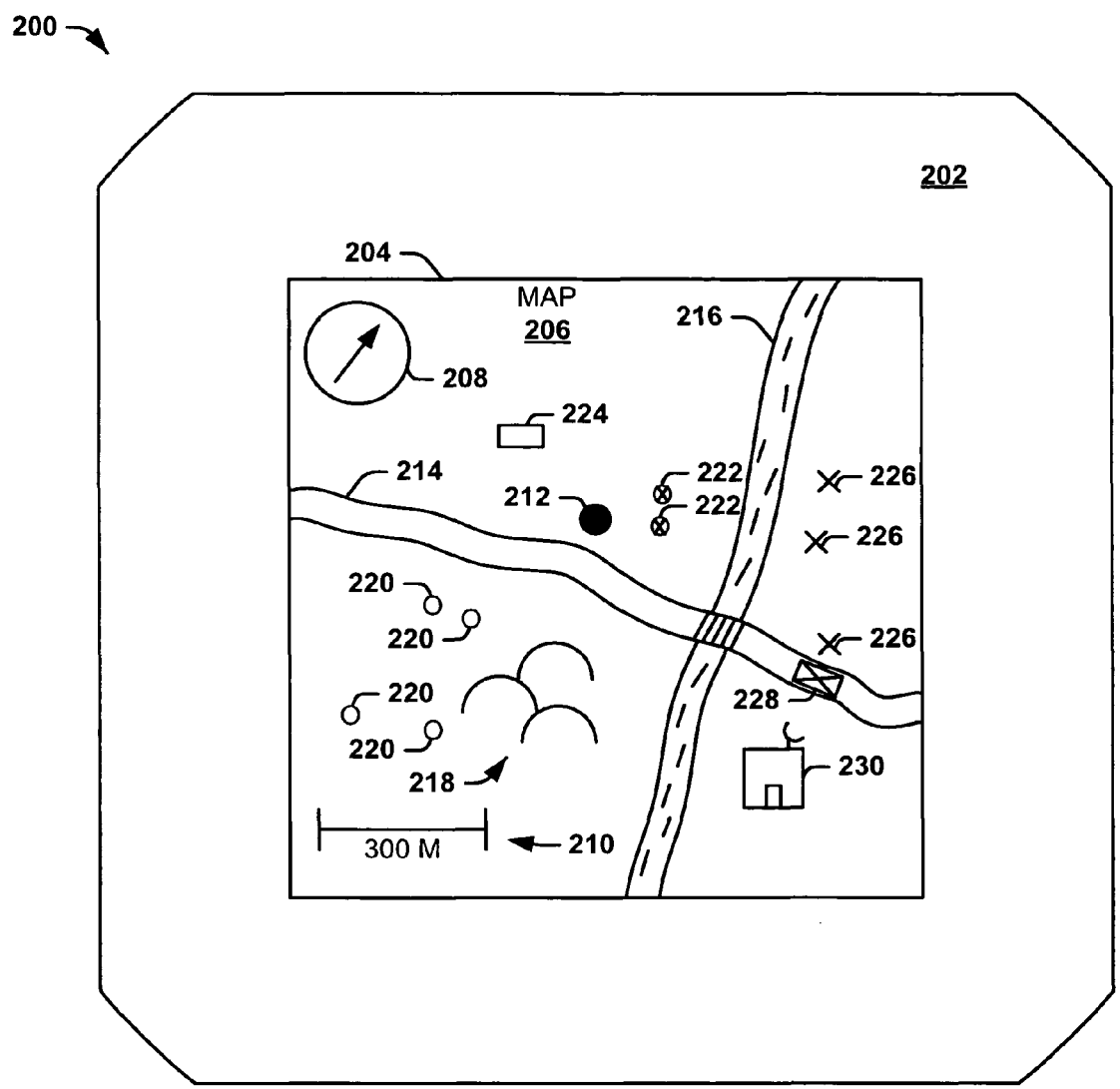
FIG. 5 illustrates another example of a mobile computer communication interface in accordance with an aspect of the invention.

FIG. 5 illustrates a mobile computer communication interface 200 in accordance with an aspect of the invention. The mobile computer communication interface 200 includes a metallic exterior cover 202. The metallic exterior cover 202 may provide a rugged protection for the more vulnerable electronic circuit components stored therein, and may also provide capability as a heat-sink and/or provide protection against EMI. The mobile computer communication interface 200 also includes a touch-screen display 204 that could be an organic LED. The touch-screen display 204 could include a 4-wire resistive touch screen capable of receiving touch inputs, either from the user's finger or from a stylus (not shown) that could be attached to or mounted within the mobile computer communication interface 200. The example of FIG. 5 demonstrates a map 206 of a battlefield region on the touch-screen display 204, such as the battlefield region 166 described above in the example of FIG. 4. The battlefield region 166 could be transmitted from a host computer and could include SA data from a plurality of users of mobile computer communication interfaces 200, such as described above in the example of FIG. 4. It is to be understood that the map 206 is illustrated in the example of FIG. 5 as a simple drawing. However, the map 206 as it appears on the touch-screen display 204 could be a real-time or still video map of the battlefield region. Alternatively, the map 206 could be map data that is digitized into a lower-resolution graphical representation on the touch-screen display 204 for faster processing and refreshed view changes.

The map 206 includes a compass 208 and a scale 210. The compass 208 could be included in the mobile computer communication interface 200, such that the mobile computer communication interface 200 could convert an analog compass signal into a digital representation on the map 206. Additionally, the mobile computer communication interface 200 could alter the orientation of the map 206 on the touch-screen display 204 based on a reference vector extending from a given surface of the mobile computer communication interface 200, such that the orientation of the map 206 always rotates relative to the facing of the user. The scale 210 could be included in the information transmitted from the host computer.

Using the compass 208 and the scale 210, a user of the mobile computer communication interface 200 can gage relative locations of terrain and other users. For example, the map includes a user 212 of the mobile computer communication interface 200. The user 212 is located approximately 50 meters slightly north of a road 214, and approximately 250 meters slightly west of a river 216. The user 212 is also approximately 300 meters north of a grouping of hills 218. Because the map 206 that is transmitted to the user 212 includes SA data pertaining to multiple users of the communication system, the user 212 is capable of locating relative positions of other users 220 and 222, and a friendly vehicle 224. Because the SA data can include more than just location data for a given user, the users 222 could appear on the map 206 differently than the users 220 to signify a different situation. For example, the users 222 could have transmitted SA data to the host computer to indicate that they are wounded, out of ammunition, or in distress, and thus could appear on the map 206 as having an "X" through them, as demonstrated in the example of FIG. 5, or as having a different color than the users 220, etc.

In addition to the user 212 being able to view relative locations of terrain and other users, the user 212 may also be able to view the relative locations of enemies on the map 206. For example, the user 212 may be able to determine the location of enemy soldiers 226, an enemy vehicle 228, and an enemy bunker 230. The location of the enemies 226, 228, and 230 as they appear on the map 206 could have been transmitted as part of the real-time video image or map data of the battlefield region. As an example, the enemies 226, 228, and 230 could be real-time images as they appear in the video data. Additionally or alternatively, a given one of the users 208, 220, and 222 may have determined the relative locations of any or all of the enemies 226, 228, and 230 using, for example, line-of-sight and/or a laser range finder. The given one of the users 208, 220, and 222 may then have input the locations of any or all of the enemies 226, 228, and 230 to the respective touch-screen display 204 of the mobile computer communication interface 200. Accordingly, the inputted locations of the enemies 226, 228, and 230 can be transmitted as part of the respective user's SA data to the host computer, to be superimposed on the real-time video image or map data of the battlefield region that is transmitted to the users 208, 220, and 222 from the host computer.

Figure 6:
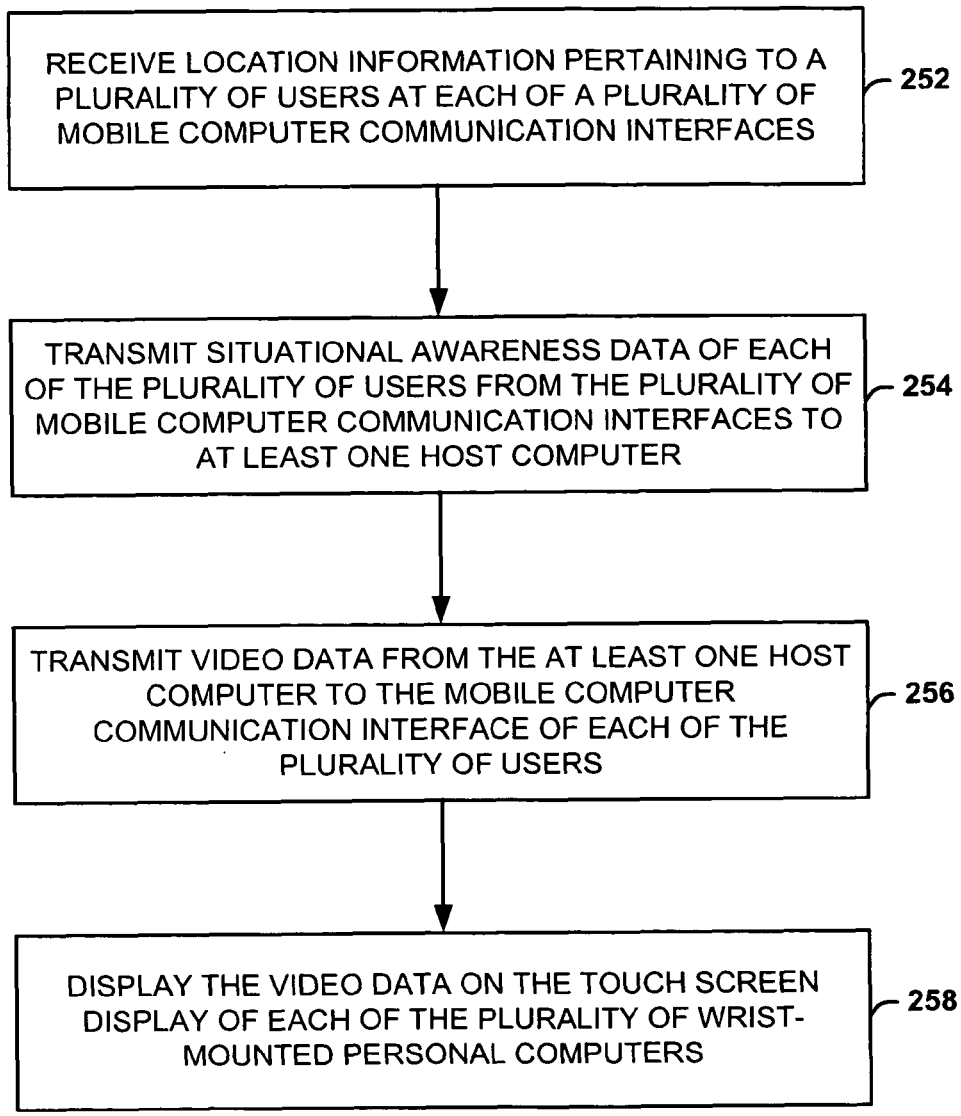
FIG. 6 illustrates a method for establishing a situational awareness (SA) map image on mobile computer communication interfaces in accordance with an aspect of the invention.

In view of the foregoing structural and functional features described above, a methodology in accordance with various aspects of the present invention will be better appreciated with reference to FIG. 6. While, for purposes of simplicity of explanation, the methodologies of FIG. 6 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 6 illustrates a method 250 for establishing a situational awareness (SA) map on mobile computer communication interfaces in accordance with an aspect of the invention. At 252, location information pertaining to a plurality of users is received at each of a plurality of mobile computer communication interfaces. The plurality of mobile computer communication interfaces may be worn by a respective one of the plurality of users, and the location information may correspond to a physical location of the respective one of the plurality of users that is receiving the location. The location information could be received via a GPS signal from a GPS satellite system. At 254, situational awareness (SA) data of each of the plurality of users is transmitted from the plurality of mobile computer communication interfaces to at least one host computer. The SA data could include the location information of each of the plurality of users, and could also include status information regarding each of the plurality of users. The transmission of the SA data to the at least one host computer could occur on a communications link that is WiFi, Bluetooth, or MeshNetwork.

At 256, video data is transmitted from the at least one host computer to the mobile computer communication interface of each of the plurality of users. The video data could be a real-time or still map image that includes the SA data of each of the plurality of users. The SA data on the map image can also include other items of interest, such as relative locations of enemies that have been input by a user to a respective mobile computer communication interface via a touch-screen display. At 258, the video data is displayed on the touch-screen display of each of the plurality of mobile computer communication interfaces. Accordingly, each of the users of the mobile computer communication interfaces are capable of perceiving relative locations of terrain, other users including status information regarding them, and other input information, such as relative locations of enemies.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A mobile computer communication interface comprising:
a global positioning satellite (GPS) receiver operative to receive location information corresponding to a physical location of the mobile computer communication interface;
a transceiver operative to send and receive wireless communications to and from a host computer, and to transmit situational awareness (SA) data associated with a user of the mobile computer communication interface to the host computer, the SA data associated with the user including the location information and at least one status condition associated with the user;
a touch-screen display operative to receive inputs from the user corresponding to at least one status condition associated with the user and to remotely display outputs provided by the host computer, the outputs including the SA data associated with the user and SA data associated with at least one additional user, the SA data associated with the at least one additional user including location information and at least one status condition associated with the at least one additional user; and
a controller operative to at least one of wirelessly access and remotely control the host computer in response to inputs from the touch-screen display.

2. The mobile computer communication interface of claim 1, wherein the controller is further operative to at least one of launch applications, input data to, and download data from the host computer, such that the received touch inputs on the touch-screen display simulate at least one of keyboard and mouse inputs on the host computer.

3. The mobile computer communication interface of claim 1, further comprising a metallic exterior cover coupled to a negative voltage supply rail, the metallic exterior cover being operative to act as a heat-sink and to shield the mobile computer communication interface from electro-magnetic interference.

4. The mobile computer communication interface of claim 1, wherein the touch-screen display is an organic LED.

5. The mobile computer communication interface of claim 1, wherein the wireless communications are one of WiFi, Bluetooth, and MeshNetwork communication standards.

6. The mobile computer communication interface of claim 1, wherein a map image is received by the transceiver from the host computer, the map image being an image of a geographical area comprising the physical location of the mobile computer communication interface.

7. The mobile computer communication interface of claim 6, wherein the touch-screen display is further operative to display the SA data superimposed on the map image.

8. The mobile computer communication interface of claim 1, further comprising one of a wrist-strap and a neck-strap, such that the user is capable of wearing the mobile computer communication interface.

9. The mobile computer communication interface of claim 1, further comprising at least one of an electronic compass and a barometric altimeter.

10. The mobile computer communication interface system of claim 1, wherein the touch-screen display is configured to display the SA data as symbols corresponding to the mobile computer communication interface system and the at least one additional mobile computer communication interface system on a map image, the symbols being demonstrated on the map image in a different manner to indicate each of the corresponding at least one status condition associated with the user and the at least one additional user.

11. The mobile computer communication interface system of claim 1, wherein the inputs received from the user correspond to locations of potential obstacles relative to a physical location of the mobile computer communication interface system, the SA data associated with the user being transmitted to the at least one additional mobile computer communication interface via the host computer to indicate the locations of the potential obstacles to the respective at least one additional user.

12. The mobile computer communication interface of claim 6, wherein the map image is a real-time high-resolution video map acquired by a camera located on an observation vehicle and provided in one of composite and S-video format.

13. The mobile computer communication interface system of claim 1, wherein the at least one status condition is associated with at least one current status condition that corresponds to at least one of the user being alive, wounded, out of ammunition, and in distress.

14. The mobile computer communication interface system of claim 10, wherein the different manner to indicate each of the corresponding at least one status condition associated with the user and the at least one additional user comprises at least one of different colors and different symbols associated with the respective at least one status condition.

15. A wrist-mounted mobile computer communication interface comprising:
a global positioning satellite (GPS) receiver operative to receive location information corresponding to a physical location of the wrist-mounted mobile computer communication interface;
a transmitter operative to wirelessly transmit situational awareness (SA) data to a host computer, the SA data including the location information;
a controller operative to at least one of wirelessly access and remotely control the host computer;
a receiver operative to wirelessly receive video data from the host computer, the video data being a real-time high-resolution video map image of a geographical area comprising the physical location of the wrist-mounted mobile computer communication interface, the real-time high-resolution video map image being acquired by a camera located on an observation vehicle and being transmitted to the host computer;
a video decoder operative to decode the video data; and
a touch-screen display operative to receive inputs from the user and to display the SA data superimposed on the map image.

16. The wrist-mounted mobile computer communication interface of claim 15, wherein the controller is further operative to at least one of launch applications, input data to, and download data from the host computer, such that the received touch inputs on the touch-screen display simulate at least one of keyboard and mouse inputs on the host computer.

17. The wrist-mounted mobile computer communication interface of claim 15, further comprising a metallic exterior cover coupled to a negative voltage supply rail, the metallic exterior cover being operative to act as a heat-sink and to shield the wrist-mounted mobile computer communication interface from electro-magnetic interference.

18. The wrist-mounted mobile computer communication interface of claim 15, wherein the touch-screen display is an organic LED.

19. The wrist-mounted mobile computer communication interface of claim 15, wherein the wireless SA data and the wireless video data are one of WiFi, Bluetooth, and Mesh-Network communication standards.

20. The wrist-mounted mobile computer communication interface of claim 15, wherein the transmitter and receiver wirelessly transmit and receive voice, video, and data information to and from the host computer.

21. The wrist-mounted mobile computer communication interface of claim 15, further comprising at least one of an electronic compass and a barometric altimeter.

22. The wrist-mounted mobile computer communication interface of claim 15, wherein the host computer is operative to wirelessly transmit and receive control, display, and information data to and from each of a plurality of wrist-mounted mobile computer communication interfaces, each of the plurality of wrist-mounted mobile computer communication interfaces being operative to transmit situational awareness (SA) data to the host computer, the SA data including the location information, and being further operative to receive a map image from the host computer, the map image being a geographical area comprising the physical location of each of the respective wrist-mounted mobile computer communication interfaces and including the SA data associated with each of the plurality wrist-mounted mobile computer communication interfaces.

23. The wrist-mounted mobile computer communication interface of claim 15, wherein the decoder is configured to decode the video data acquired by a camera located on an observation vehicle and in one of composite or S-video format.

24. A mobile communication system comprising:
a plurality of wrist-mounted mobile computer communication interfaces, each of the plurality of wrist-mounted mobile computer communication interfaces comprising an organic LED touch-screen display and a GPS receiver, the GPS receiver being operative to receive location information corresponding to a physical location of a respective one of the plurality of wrist-mounted mobile computer communication interfaces; and
a host computer operative to wirelessly transmit and receive control, display, and information data to and from each of the plurality of wrist-mounted mobile computer communication interfaces, each of the plurality of wrist-mounted mobile computer communication interfaces being operative to input and transmit situational awareness (SA) data to the host computer, the SA data including the location information and a physical location of potential obstacles, and being further operative to receive the map image from the host computer, the map image being a geographical area comprising the physical location of each of the respective wrist-mounted mobile computer communication interfaces and including the SA data associated with each of the plurality wrist-mounted mobile computer communication interfaces superimposed over the map image.

25. The mobile communication system of claim 24, wherein each of the plurality of wrist-mounted mobile computer communication interfaces comprise a controller operative to at least one of wirelessly access and remotely control the host computer.

26. The mobile communication system of claim 25, wherein the controller is further operative to at least one of launch applications, input data to, and download data from the host computer, such that the received touch inputs on the touch-screen display simulate at least one of keyboard and mouse inputs on the host computer.

27. The mobile communication system of claim 24, wherein each of the plurality of wrist-mounted mobile computer communication interfaces comprises a metallic exterior cover coupled to a negative voltage supply rail, the metallic exterior cover being operative to act as a heat-sink and to shield each of the plurality of wrist-mounted mobile computer communication interfaces from electro-magnetic interference.

28. The mobile communication system of claim 24, wherein the control, display, and information data are wirelessly transmitted on one of WiFi, Bluetooth, and MeshNetwork communication standards.

29. The mobile communication system of claim 24, wherein the map image is one of a real-time video map, a still photograph map, and a graphical representation map.

30. The mobile communication system of claim 24, wherein the SA data includes at least one status condition associated with respective users of the plurality of wrist-mounted mobile communication interfaces, and wherein the touch-screen display of each of the plurality of wrist-mounted mobile communication interfaces is configured to display the location information of each of the wrist-mounted mobile computer communication interfaces as symbols on the map image in a different manner to indicate each of the corresponding the at least one status condition of the respective users.

31. The mobile communication system of claim 24, wherein the host computer is located in a vehicle.

32. A method comprising:
receiving location information of each of a plurality of mobile computer communication interfaces, each of the plurality of mobile computer communication interfaces being worn by a respective one of a plurality of users, the location information corresponding to a physical location of the respective one of the plurality of mobile computer communication interfaces that is receiving the location information;
receiving at least one of location information associated with potential obstacles relative to the physical location of the respective one of the plurality of mobile computer communication interfaces and status condition information corresponding to at least one status condition associated with at least one of the plurality of users from a respective at least one of the plurality of mobile computer communication interfaces based on inputs provided by the respective at least one of the plurality of users;
transmitting situational awareness (SA) data from each of the plurality of mobile computer communication interfaces to a host computer, the SA data including the location information of each of the plurality of mobile computer communication interfaces, the location information associated with the potential obstacles, and the status condition information;
transmitting a map image on which the SA data associated with each of the plurality of users is superimposed to at least one of the wrist-mounted mobile computer communication interfaces; and
displaying the map image on a touch-screen display of the at least one of the plurality of mobile computer communication interfaces.

33. The method of claim 32, further comprising at least one of wirelessly accessing and controlling the host computer via at least one of the plurality of mobile computer communication interfaces.

34. The method of claim 33, further comprising at least one of launching applications, inputting data to, and downloading data from the host computer via the at least one of the plurality of mobile computer communication interfaces, such that the received touch inputs on the touch-screen display simulate at least one of keyboard and mouse inputs on the host computer.

35. The method of claim 32, wherein the transmitting SA data and video data further comprises utilizing one of WiFi, Bluetooth, and MeshNetwork communication standards.

36. The method of claim 32, wherein the transmitting the map image further comprises transmitting a real-time video map image acquired by a camera located on an observation vehicle and encoded in one of composite and S-video formats.

37. The method of claim 32, wherein the plurality of mobile computer communication interfaces are each wrist mounted devices.

38. The method of claim 32, further comprising:
acquiring the map image via a camera located in an observation vehicle;
transmitting the map image to the host computer; and
superimposing the SA data onto the map image via the host computer;
wherein transmitting the map image to the at least one of the wrist-mounted mobile computer communication interfaces comprises transmitting the map image to the at least one of the wrist-mounted mobile computer communication interfaces via the host computer.

\* \* \* \* \*